April 28, 1931. C. E. McCOLLAM 1,802,922
SIGNALING DEVICE
Filed Sept. 4, 1930
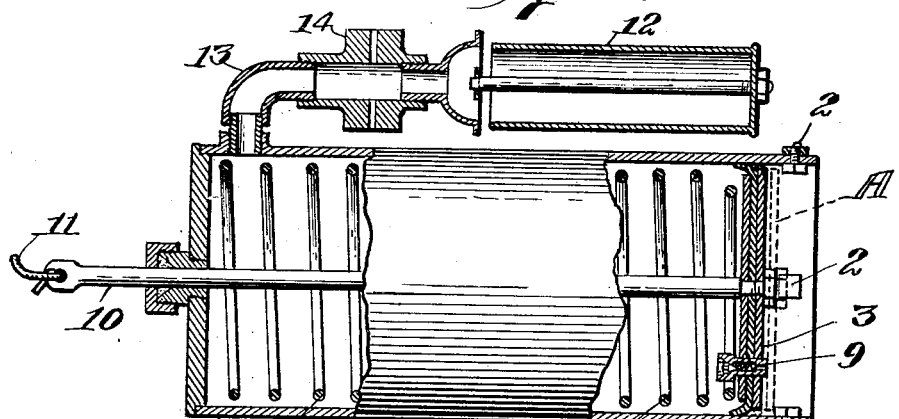
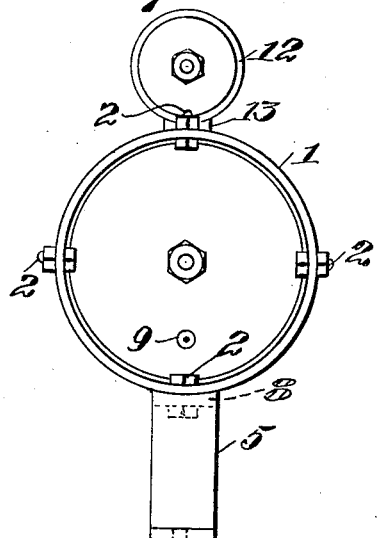
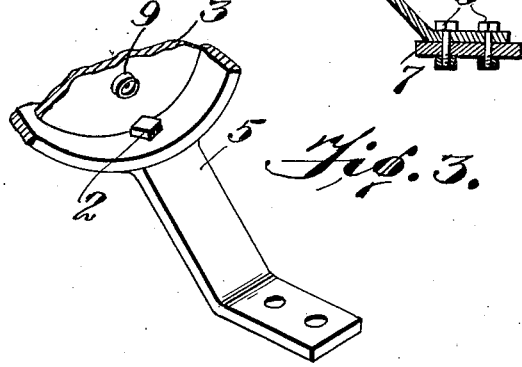
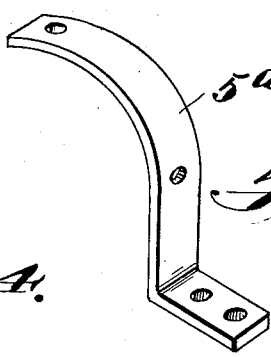
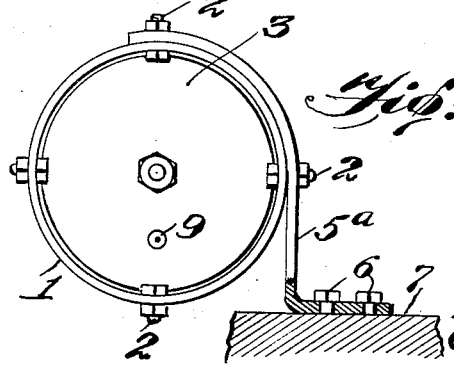
INVENTOR.
Clarence E. McCollam.
BY
E. E. Vrooman & Co.,
His ATTORNEYS.

Patented Apr. 28, 1931

1,802,922

UNITED STATES PATENT OFFICE

CLARENCE E. McCOLLAM, OF MARINGOUIN, LOUISIANA

SIGNALING DEVICE

Application filed September 4, 1930. Serial No. 479,729.

This invention relates to a signaling device.

An object of my invention is the construction of a simple and efficient signaling device, or "whistle", for use on railway motor cars, motorboats and highway motor vehicles.

Another object of my invention is the construction of a signaling device, more especially adapted for use on railway motor cars, because my device is a signal or "whistle" that will give adequate warning when operated, which can not be mistaken in any particular.

It is to be understood that the usual automobile horn is misleading in that it is not distinctive enough to distinguish its signal from any other ordinary signal carried by a motor vehicle, and, therefore, it is my object to produce an efficient signal that can be distinguished, and by using same, collisions and accidents will be reduced to a minimum.

With the foregoing and other objects in view, my invention comprises certain novel constructions, combinations and arrangements of parts as will be hereinafter fully described, illustrated in the accompanying drawings and more particularly pointed out in the appended claims.

In the drawings:

Figure 1 is a view partly in side elevation and partly in longitudinal section of a device constructed in accordance with the present invention, while Figure 2 is a view in elevation of the right hand end of the device.

Figure 3 is a fragmentary, perspective view of the device showing particularly the supporting bracket thereof.

Figure 4 is an end view of another embodiment of my invention.

Figure 5 is a perspective view of the bracket of the device shown in Figure 4.

Referring to the drawings by numerals, 1 designates the casing that is preferably closed at its left hand end and open at its right hand end (Fig. 1). Placed around the casing 1 at suitable intervals are stop bolts 2; these bolts perform two functions, as will be hereinafter described. The heads of these bolts preferably are positioned in the casing 1 against which the piston head 3 strikes when it has moved to its outermost position by action of the coil spring 4. This outermost position is indicated by dotted lines "A". The angle supporting bracket 5 is secured by bolts 6 to a suitable support 7 of the vehicle, upon which my signaling device is mounted. The upper or outer end 8 of bracket 5, conforms to the contour of the outer face of the casing 1 and a stop bolt 2 extends through end 8 securely fastening the casing 1 in position. As shown in Figure 4, the bracket 5a extends a greater distance around casing 1 than bracket 5, and two stop bolts 2 extend through said bracket, securing the same to the casing. Therefore, it will be seen that not only do the stop bolts 2 limit the outward movement of the piston head 3, but they also provide the means for attaching casing 1 to the supporting bracket.

The piston head 3 is provided with an inlet valve 9.

A rod 10 is threaded at its inner end into piston head 3 and its outer end extends beyond the closed end of casing 1. To the outer end of rod 3 is attached a suitable cord or cable 11, which extends within reach of the operator of the device.

A signaling device 12, which may be a whistle, reed horn or the like, is in communication with the interior of casing 1 by means of the piping 13 and coupler 14.

In operation, when the operator pulls upon cable 11, the piston head 3 is forced inwardly towards the closed end of the casing, causing the compressed air to rush through piping 13 and coupling 14 into the signaling device 12, thereby sounding the alarm. Then when the operator releases cable 11, the coil spring 4 is of sufficient strength to force the piston head 3 against the stop bolts 2; during the outward movement of the piston head, the valve device 9 is open, permitting air to enter the compression chamber, formed by casing 1, ready for the next operation.

It will be noted that any suitable type of a signaling or sound device can easily be connected to casing 1, for the purpose described.

While I have described the preferred embodiments of my invention and illustrated in the same in the accompanying drawings, certain minor changes or alterations may appear to one skilled in the art to which this invention relates during the extensive manufacture of the same, and I, therefore, reserve the right to make such changes or alterations as may fairly fall within the scope of the appended claims.

What I claim is:

1. In a device of the class described, the combination of a casing, a bracket against said casing, a stop bolt extending through a portion of said casing and bracket securing the same together, a piston head in said casing and adapted to rest against said stop bolt, a signaling device attached to said casing, and means for operating said piston head.

2. In a device of the class described, the combination of a casing, a bracket having a portion conforming to the contour of said casing and engaging the same, piston-head stop means extending into said casing and securing said bracket to said casing, a piston head in said casing and normally against said stop means, and a signaling device attached to said casing.

3. In a device of the class described, the combination of an open ended casing, a supporting bracket provided with an outer end conforming to and extending partly around the open end of said casing, a plurality of stop bolts having their heads in said casing and extending through the outer end of said bracket engaging said casing, securing the bracket and casing together, a signal attached to said casing, and a spring pressed piston head in said casing and normally bearing against said bolt heads, substantially as shown and described.

4. In a device of the class described, the combination of an open ended casing, a series of bolts extending through said casing near its open end, a bracket attached to some of said bolts, a piston head in said casing and normally bearing against all of said bolts, a signaling device attached to said casing, and means for operating said piston head for actuating said signaling device.

5. In a device of the class described, the combination with a support, of a bracket having its inner end secured to said support and its outer end extending outwardly from said support, an open ended casing with its open end secured to the outer end of said bracket, said casing having its closed end extending outwardly from the bracket, a cable carrying rod extending through said closed end into said casing, a valved piston head fastened to the inner end of said rod, a coil spring around said rod within said casing between said closed end and piston head, and a signaling device mounted on said casing, substantially as shown and described.

In testimony whereof I hereunto affix my signature.

CLARENCE E. McCOLLAM.